United States Patent [19]

Dominguez

[11] Patent Number: 4,474,900

[45] Date of Patent: Oct. 2, 1984

[54] REACTION INJECTION MOLDED ELASTOMERS

[75] Inventor: Richard J. G. Dominguez, Austin, Tex.

[73] Assignee: Texaco Inc., White Plains, N.Y.

[21] Appl. No.: 502,382

[22] Filed: Jun. 8, 1983

[51] Int. Cl.³ .............................................. C08G 18/14
[52] U.S. Cl. .................................. 521/110; 521/112; 521/114; 521/156; 528/48; 528/73
[58] Field of Search ............... 521/110, 112, 114, 156; 528/48, 73

[56] References Cited

U.S. PATENT DOCUMENTS

| | | | |
|---|---|---|---|
| 3,919,166 | 11/1975 | Brachman | 521/156 |
| 4,127,542 | 11/1978 | Kaizerman et al. | 528/73 |
| 4,357,463 | 11/1982 | Blount | 521/156 |
| 4,377,646 | 3/1983 | Blount | 521/156 |

*Primary Examiner*—Maurice J. Welsh
*Attorney, Agent, or Firm*—Robert A. Kulason; Jack H. Park; Kenneth R. Priem

[57] ABSTRACT

The invention relates to reaction injection molded elastomers derived from high molecular weight amine terminated polyethers and/or high molecular weight polyols, a chain extender, a polyisocyanate and an epoxy modified filler material. The reaction injection molded (RIM) elastomers of this invention are useful, for example, as automobile body parts.

27 Claims, No Drawings ature with a small amount of propylene oxide to insure the majority of the hydroxyls are secondary hydroxyl groups.

REACTION INJECTION MOLDED ELASTOMERS

This application is related to application Ser. No. 371,160; application Ser. No. 371,161 (now allowed); application Ser. No. 371,376; and application Ser. No. 371,377; all filed Apr. 23, 1982. Applications having Ser. No. 502,389 filed June 8, 1983 and Ser. No. 502,397 filed June 8, 1983, now U.S. Pat. No. 4,448,904, both filed of even date, are also related.

BACKGROUND OF THE INVENTION

1. Field of the Invention

This invention concerns the field of reaction injection molded elastomers.

2. Description of the Prior Art

Our U.S. Pat. Nos. 4,254,069 and 4,272,618 concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, amines, including aromatic diamines, are disclosed. However, the actual examples are of polyether polyurethanes using polyols (hydroxyl terminated) of high molecular weight. The chain extender, monoethanolamine, was used as a crosslinker.

U.S. Pat. No. 3,838,076 and 3,847,992 disclose foams made from amine terminated polyethers, wherein the amine termination ranges from 10 to 50 percent and 15 to 55 percent, respectively.

Quillery's U.S. Pat. No. 3,523,918 describes the use of amine chain extenders for the preparation of integral skin foams. Also, Bayer's U.S. Pat. No. 4,218,543 describes the use of high molecular weight polyols, certain aromatic diamines and isocyanates for the production of RIM parts. This Bayer patent specifically claims as a chain extender 1-methyl-3,5-diethyl-2,4-diaminobenzene (diethyltoluene diamine) and its isomer.

Turner's U.S. Pat. No. 4,246,363 claims a RIM polyurethane composition derived from using at least three different polyols (including amine terminated polyethers) having specific relationships and reactivity and solubility parameters to one another. Also, Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group.

Previously filed applications, Ser. Nos. 371,161 now U.S. Pat. No. 4,396,729; 371,376 now U.S. Pat. No. 4,444,910; 371,377 now abandoned and 371,160 now U.S. Pat. No. 4,433,067 relate to elastomers prepared using a high molecular weight amine terminated polyether, an aromatic diamine chain extender and a polyisocyanate which may be merely a polyisocyanate or a quasi-prepolymer prepared from a polyol reacted with a polyisocyanate wherein isocyanate groups are still left unreacted.

In conventional RIM systems, the so-called A-component contains the isocyanate, whether it is pure isocyanate or a quasi-prepolymer, and a B-component which contains the active hydrogen containing materials, catalysts if needed, and most other additives, including reinforcing materials such as glass, fibers or milled glass. Internal mold release agents mentioned in the patent applications above are also added to the B-component. However, the internal mold release agents have been found to interfere with glass-polymer adhesion, resulting in an unsatisfactory composite. I have found that by changing the surface treatment of a filler material to contain epoxide moities, this problem can be corrected.

SUMMARY OF THE INVENTION

The invention is reaction injection molded (RIM) elastomer comprising a cured reaction product of polyols of greater than about 1,500 molecular weight and/or primary or secondary amine terminated polyethers of greater than 1,500 molecular weight, a chain extender, an epoxy modified filler material and an aromatic polyisocyanate. The invention is also a method of preparation of a RIM elastomer as described above.

DESCRIPTION OF THE PREFERRED EMBODIMENTS

The polyols useful in the process of this invention include polyether polyols, polyester diols, triols, tetrols, etc., having an equivalent weight of at least 500, and preferably at least 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters are hydroxyl terminated rubbers (such as hydroxyl terminated polybutadiene). Hydroxyl terminated quasi-prepolymers of polyols and isocyanates are also useful in this invention.

Especially preferred are amine terminated polyethers including primary and secondary amine terminated polyether polyols of greater than 1,500 average molecular weight having from 2 to 6 functionality, preferably from 2 to 3, and an amine equivalent weight from about 750 to about 4,000. Mixtures of amine terminated polyethers may be used. In a preferred embodiment the amine terminated polyethers have an average molecular weight of at least 2,500. These materials may be made by various methods known in the art.

The amine terminated polyether resins useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

Also, mixtures of polyols and amine terminated polyethers are included within the scope of my invention.

The chain extenders useful in the process of this invention are preferably difunctional. Mixtures of difunctional and trifunctional chain extenders are also useful in this invention. The chain extenders useful in this invention include diols, (ethylene glycol and 1,4-butane diol, for example) amino alcohols, diamines or mixtures thereof.

The aromatic diamine chain extenders useful in this invention include, for example, 1-methyl-3,5-diethyl-2,4 diaminobenzene, 1-methyl-3,5 diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

Other chain extenders which find use in the method of this invention are low molecular weight polyoxyalkylene polyamines which contain terminal amine groups and are represented by the formula

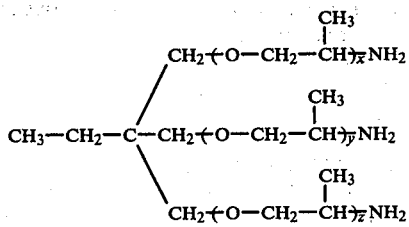

wherein x+y+z has a value of about 5.3. The average amine hydrogen equivalent weight is about 67 and the product is commercially available from Texaco Chemical Company as JEFFAMINE® T-403. Another related polyoxypropylene polyamine is represented by the formula

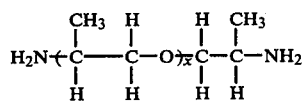

wherein x has a value of about 5.6. This product has an average amine hydrogen equivalent weight of about 100 and is commercially available from Texaco Chemical Company as JEFFAMINE D-400. The product having the same formula as above wherein x has an average value of about 2.6 is also useful. This product has an average amine hydrogen equivalent weight of about 57.5 and is commercially available from Texaco Chemical Company as JEFFAMINE D-230.

Other chain extenders will be apparent to those skilled in the art and the above recitation is not intended to be a limitation on the invention claimed herein.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

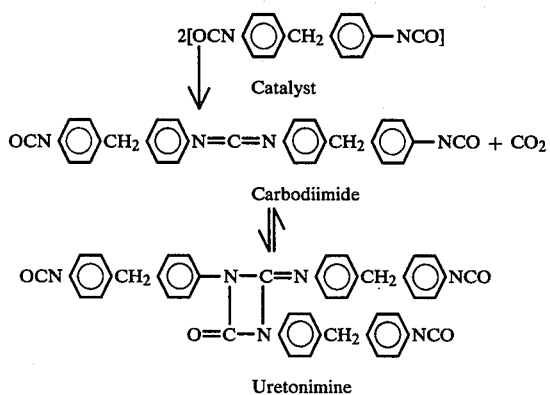

Examples of commercial materials of this type are Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

If needed, the following catalysts are useful. Catalysts such as tertiary amines or an organic tin compound or other polyurethane catalysts are used. The organic tin compound may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof may be used.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing or filler materials useful in the practice of my invention are epoxy modified materials such as milled glass, flaked glass, mica or Wellastonite, for example.

Also useful are materials which also contain epoxy compatible moieties. For example, chopped or milled glass fibers with epoxy modification are useful. These materials are available commercially. The materials used in the following examples are designated P174J-X1 and P346B-X1 from Owens-Corning Fiberglas. Modification of glass materials to contain epoxy moities is a known procedure in the art and has been discussed in prior publications. For example, *Modern Plastics Encyclopedia*, 1977–78, copyright 1977 by McGraw-Hill, Inc., published an article entitled "Coupling Agents," by Ward Collins. In this publication, these epoxy modified materials were made using silane coupling agents which are hybrid materials possessing a functionality of an organic reactive group at one end of the molecule and the inorganic alkoxy silane functionality at the opposite end. In this article, the epoxy modified silane was given a chemical structure as follows:

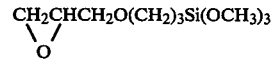

Glass based materials with epoxy functionalities such as those disclosed by Ward Collins are useful in my invention. However, other epoxy modified glass based materials using reinforcing agents are included within the scope of my invention.

Other treated filler materials may also be used, including epoxy treated materials other than glass as mentioned above. Any material treated with a moiety which is reactive with active hydrogens will, with limited experimentation, be found useful by those skilled in the art. Therefore, my invention is not to be limited to the glass based materials with epoxy functionalities disclosed above.

The mold release agents useful for the method of this invention are internal mold release agents. The preferred mold release agent is Dow-Corning Q2-7119. This mold release agent is a dimethyl siloxane with organic acid groups manufactured by Dow-Corning Corporation.

Post curing of the elastomers of the invention is optional. Post curing will improve some properties such as heat sag. Employment of post curing, however, depends on the desired properties of the end product.

The examples in Table I are described below. The examples are in the form of comparative examples, including examples falling within the scope of the invention, which includes columns F, G, H and I. Comparative Examples A, B, C, D and E are given to demonstrate the improvement of the invention as explained below.

EXAMPLE I

An elastomer with the following formulation has the enviable property of releasing from bare steel without the addition of external mold release agents (wax or soap release aids sprayed onto the mold surfaces before each shot).

B-Component 62.33 pbw JEFFAMINE ® T-5000 polyamine
17.7 pbw Diethyltoluenediamine (DETDA)
0.7 pbw Q2-7119 (dimethylsiloxane release agent from Dow-Corning)

A-Component 38 pbw THANATE ® L55-0 quasi-prepolymer
19 pbw Isonate 143L Liquid MDI isocyanate When this formulation is processed in a RIM machine, an elastomer is produced which has the properties given in Table I, col. A. When enough 1/32" milled glass is added to the B-component to produce an elastomer with 10% by weight glass overall, a reinforced RIM elastomer is produced. The properties of a number of such elastomers made with the same basic glass type (1/32" milled glass fibers) but with different surface treatments on the glass are given in Table I columns B through I. Looking across Table I on the "Glass type" row in columns B and C we come to "739". This is glass with no surface treatment to bind it to the matrix elastomer. Note that the elongation of this reinforced RIM elastomer is similar to the elongation to the unreinforced RIM elastomer (Table I col. A). This means that with or without the "mold release agent", there is poor adhesion between the glass and elastomer matrix when the glass does not have a surface treatment.

The next two columns (Table I cols. D and E) demonstrate the performance using the "737" glass with an amino silane surface treatment. When no "mold release agent" is present (Table I col. D) a reduction in elongation is observed when compared to the unreinforced material (Table 1 col. A) and the reinforced material where the glass has no surface treatment (Table 1, cols. B and C). This means that there is a significant polymer-glass bond. When the "internal mold release agent" is added (Table I, col. E) an increase in elongation is observed, said increase causing the elongation to be comparable to the no glass case (Table I, col. A) and the glass containing cases where the glass does not have a surface treatment (Table I, cols. B and C). Thus, the internal mold release agent interferes with reinforcement action which addition of glass is supposed to produce. Also note that for the two glass types in the above discussion (739 and 737) a drop in flexural modulus and an increase in heat sag is observed when the "internal mold release agent" is added to the formulation.

The last four columns (Table I cols. F through I) give the properties of the same elastomer where the glass reinforcement has epoxide moieties in the surface treatment. These epoxide moieties are reactive towards amines and so polymer-glass adhesion is promoted. Note that when the "internal mold release agent" is added to formulations containing the P174J-X1 glass (Table I cols. F and G) and the P346B-X1 glass (Table I, cols. H and I) no detrimental effect on the properties is observed. In fact, the elongation drops a bit and the flexural modulus increases a bit with the addition of the "internal mold release agent". Thus, the incorporation of the epoxy groups on the surface treatment which is applied to the glass has resulted in a composite with excellent properties with or without an "internal mold release agent".

TABLE I

Glass-Filled (OCF 1/32" Milled Glass Fibers) Internal Mold Release Fascia[1]

| Column | A | B | C | D | E | F | G | H | I |
|---|---|---|---|---|---|---|---|---|---|
| Glass type | — | 739 | 739 | 737 | 737 | P174J-X1 | P174J-X1 | P346B-X1 | P346B-X1 |
| Glass, wt % | 0 | 10 | 10 | 10 | 10 | 10 | 10 | 10 | 10 |
| Sample orientation | par/perp | par/perp | par/perp | par/perp | par/perp | par/perp | par/perp | par/perp | par/perp |
| Mold release agent | Yes | No/No | Yes/Yes | No/No | Yes/Yes | No/No | Yes/Yes | No/No | Yes/Yes |
| Tensile, psi | 3100 | 2800/2570 | 3050/2550 | 2550/2480 | 2400/2490 | 2500/2500 | 2500/2500 | 2700/2500 | 2700/2500 |
| Elongation, % | 240 | 230/230 | 230/210 | 180/190 | 220/220 | 140/180 | 130/180 | 100/170 | 90/150 |
| Tear, pli | 390 | 360/370 | 370/360 | 410/400 | 340/360 | 400/380 | 435/380 | 480/390 | 450/410 |
| Flex mod, psi × 1000 measured | 30 | 36/36 | 36/35 | 41/39 | 40/37 | 47/41 | 52/43 | 57/43 | 66/43 |
| @ RT 158° F. | 24 | 29/30 | 24/28 | 33/31 | 28/29 | 37/34 | 40/34 | 46/36 | 54/34 |
| −20° F. | 63 | 78/80 | 71/72 | 80/82 | 79/80 | 89/85 | 105/84 | 108/92 | 123/81 |
| Heat sag, mm 150 mm o'hang 1 hr @ 250° F. | 16 | 14/14 | 18/20 | 14/17 | 16/17 | 9/11 | 10/8 | 6/8 | 7/9 |

[1]1.05 Isocyanate index, post cured at 250° F. for 60 min.

GLOSSARY OF TERMS AND MATERIALS

| | |
|---|---|
| ISONATE ® 143L | Carbodiimide modified liquid MDI; a product of the Upjohn Co. |
| JEFFAMINE ® T-5000 | Polypropylene oxide triamine of about 5,000 molecular weight; a product of Texaco Chemical Co. |
| DETDA | Diethyltoluene diamine; a product of Ethyl Corp. |
| THANOL ® SF-5505 | A 5500 molecular weight polyether triol containing approximately 80% primary hydroxyl groups. |
| THANATE ® L-55-0 | Quasi-prepolymer - A quasi-prepolymer formed by reacting equal weight of ISONATE 143L and THANOL SF-5505; a product of Texaco Chemical Co. |

I claim:

1. A reaction injection molded elastomer made by reacting in a closed mold amine terminated polyethers of greater than 1,500 average molecular weight having greater than 50% of their active hydrogen in the form of amine hydrogens, a chain extender, an epoxy modified filler material and an aromatic polyisocyanate.

2. An elastomer as in claim 1 wherein the amine terminated polyethers have an average molecular weight of at least 2,500.

3. An elastomer as in claim 1 wherein the epoxy modified filler material is glass based.

4. An elastomer as in claim 1 wherein the amine terminated polyethers have a functionality ranging from about 2 to 3.

5. An elastomer as in claim 1 wherein the amine terminated polyether is an aminated polyoxypropylene triol having an average molecular weight of about 5,000.

6. An elastomer as in claim 1 wherein the chain extender is diethyltoluene diamine.

7. An elastomer as in claim 1 wherein the polyisocyanate is a quasi-prepolymer.

8. A reaction injection molded elastomer made by reacting in a closed mold amine terminated polyethers of at least 2,500 molecular weight and having a functionality of from about 2 to 3 having greater than 50% of their active hydrogen in the form of amine hydrogens, a chain extender, an epoxy modified filler material and an aromatic polyisocyanate.

9. An elastomer as in claim 8 wherein the chain extender is diethyltoluene diamine.

10. An elastomer as in claim 8 wherein the epoxy modified filler material is glass based.

11. A reaction injection molded elastomer made by reacting in a closed mold amine terminated polyethers of at least 5,000 molecular weight and having a functionality of from about 2 to 3 having greater than 50% of their active hydrogens in the form of amine hydrogens, a chain extender, an epoxy modified filler material and a polyisocyanate.

12. An elastomer as in claim 11 wherein the chain extender is diethyltoluene diamine.

13. An elastomer as in claim 11 wherein the epoxy modified filler material is glass based.

14. A method for making a reaction injection molded elastomer comprising reacting in a closed mold amine terminated polyethers greater than 1,500 average molecular weight having greater than 50% of their active hydrogen in the form of amine hydrogens, a chain extender, an epoxy modified filler material and an aromatic polyisocyanate.

15. A method as in claim 14 wherein the amine terminated polyethers have an average molecular weight of at least 2,500.

16. A method as in claim 15 wherein the epoxy modified filler material is glass based.

17. A method as in claim 14 wherein the amine terminated polyethers have a functionality ranging from about 2 to 3.

18. A method as in claim 14 wherein the amine terminated polyether is an aminated polyoxypropylene triol having an average molecular weight of about 5,000.

19. A method as in claim 14 wherein the chain extender is diethyltoluene diamine.

20. A method as in claim 14 wherein the polyisocyanate is a quasi-prepolymer.

21. A method for making a reaction injection molded elastomer comprising reacting in a closed mold amine terminated polyethers of at least 2,500 molecular weight and having a functionality of from about 2 to 3 having greater than 50% of their active hydrogen in the form of amine hydrogens, a chain extender, an epoxy modified filler material and an aromatic polyisocyanate.

22. A method as in claim 21 wherein the chain extender is diethyltoluene diamine.

23. A method for making a reaction injection molded elastomer comprising reacting in a closed mold amine terminated polyethers of at least 5,000 molecular weight and having a functionality of from about 2 to 3 having greater than 50% of their active hydrogen in the form of amine hydrogens, an amine terminated chain extender, an epoxy modified filler material and an aromatic polyisocyanate.

24. A method as in claim 23 wherein the chain extender is diethyltoluene diamine.

25. A method as in claim 23 wherein the epoxy modified filler material is glass based.

26. A reaction injection molded elastomer made by reacting in a closed mold a polyether polyol having an equivalent weight of at least 500, a chain extender, an epoxy modified filler material and an aromatic polyisocyanate.

27. A method for making a reaction injection molded elastomer comprising reacting in a closed mold a polyether polyol having an equivalent weight of at least 500, a chain extender, an epoxy modified filler material and an aromatic polyisocyanate.

* * * * *